(12) United States Patent
Puzyrev et al.

(10) Patent No.: US 10,801,827 B1
(45) Date of Patent: Oct. 13, 2020

(54) SENSOR BASED ON SMART RESPONSE OF TWO-DIMENSIONAL NANOMATERIAL AND ASSOCIATED METHOD

(71) Applicant: AT&T Intellectual Property I, L.P., Atlanta, GA (US)

(72) Inventors: Yevgeniy Puzyrev, Cumming, GA (US); Sheldon Kent Meredith, Roswell, GA (US); John Francis, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/403,196

(22) Filed: May 3, 2019

(51) Int. Cl.
*G01L 7/00* (2006.01)
*G01B 7/16* (2006.01)
*G01L 1/22* (2006.01)

(52) U.S. Cl.
CPC .............. *G01B 7/18* (2013.01); *G01L 1/2287* (2013.01)

(58) Field of Classification Search
CPC ................................ G01B 7/18; G01L 1/2287
USPC .......................................................... 73/774
See application file for complete search history.

(56) References Cited

U.S. PATENT DOCUMENTS

| | | | |
|---|---|---|---|
| 3,779,071 A | 12/1973 | Thomas et al. | |
| 5,936,293 A * | 8/1999 | Parkin | G01R 33/06 |
| | | | 257/422 |
| 6,023,395 A * | 2/2000 | Dill | B82Y 10/00 |
| | | | 360/324.2 |
| 6,986,287 B1 | 1/2006 | Dorfman | |
| 7,875,211 B1 | 1/2011 | Veedu | |
| 7,938,012 B2 | 5/2011 | Lv et al. | |
| 7,966,898 B2 | 6/2011 | Roukes et al. | |
| 8,191,433 B2 | 6/2012 | Tao et al. | |
| 8,250,927 B2 | 8/2012 | Anand et al. | |
| 8,272,273 B2 | 9/2012 | Chen et al. | |
| 8,586,393 B2 | 11/2013 | Farahani et al. | |

(Continued)

FOREIGN PATENT DOCUMENTS

| | | |
|---|---|---|
| JP | 2014038088 A | 2/2014 |
| RU | 2662060 C1 | 7/2018 |

(Continued)

OTHER PUBLICATIONS

"Atomic layer deposition", https://en.wikipedia.org/wiki/Atomic_layer_deposition, 2019, 13 pages.

(Continued)

*Primary Examiner* — Max H Noori
(74) *Attorney, Agent, or Firm* — Guntin & Gust, PLC; Ralph Trementozzi

(57) ABSTRACT

Aspects of the subject disclosure may include, for example, a method comprising: applying to a substrate a first two-dimensional layer; and applying to the first two-dimensional layer a second two-dimensional layer, wherein the first two-dimensional layer and the second two-dimensional layer form a bi-layer element, wherein the bi-layer element has an axis, wherein there is an initial electrical resistance across the bi-layer element along the axis, and wherein a first change to the substrate results in a second change to the bi-layer element such that the initial electrical resistance is replaced by a lower electrical resistance. Other embodiments are disclosed.

20 Claims, 9 Drawing Sheets

(56) References Cited

U.S. PATENT DOCUMENTS

| | | | |
|---|---|---|---|
| 8,984,954 B2 | 3/2015 | Merrell et al. | |
| 9,068,283 B2 | 6/2015 | Biris et al. | |
| 9,119,272 B2 * | 8/2015 | Sakaguchi | H05B 33/26 |
| 9,329,021 B1 | 5/2016 | Deluca et al. | |
| 9,476,782 B2 | 10/2016 | Suzuki et al. | |
| 9,618,403 B2 | 4/2017 | Li et al. | |
| 9,954,088 B2 * | 4/2018 | Bera | H01L 29/7786 |
| 9,959,004 B2 | 5/2018 | Lång et al. | |
| 2008/0292887 A1 | 11/2008 | Kim et al. | |
| 2009/0152235 A1 * | 6/2009 | Hsiao | G11B 5/1278 |
| | | | 216/22 |
| 2009/0154027 A1 * | 6/2009 | Balamane | B82Y 10/00 |
| | | | 360/319 |
| 2010/0154556 A1 | 6/2010 | Yin | |
| 2013/0340533 A1 | 12/2013 | Hofmann et al. | |
| 2014/0212672 A1 | 7/2014 | Han et al. | |
| 2015/0122531 A1 | 5/2015 | Monson et al. | |
| 2015/0293065 A1 | 10/2015 | Kissell et al. | |
| 2016/0233325 A1 * | 8/2016 | Bera | H01L 29/7786 |
| 2016/0284859 A1 * | 9/2016 | Asami | H01L 29/7869 |
| 2016/0313818 A1 * | 10/2016 | Kim | G06F 3/044 |
| 2017/0241847 A1 | 8/2017 | Loh et al. | |
| 2018/0018055 A1 | 1/2018 | Li | |
| 2018/0251641 A1 | 9/2018 | Vasileiou et al. | |
| 2018/0308793 A1 * | 10/2018 | Lin | H01L 21/0234 |

FOREIGN PATENT DOCUMENTS

| | | |
|---|---|---|
| WO | 2008135606 A1 | 11/2008 |
| WO | 2012027587 A3 | 3/2014 |

OTHER PUBLICATIONS

Bo, Hou et al., "Crack monitoring method based on Cu coating sensor and electrical potential technique for metal structure", Chinese Journal of Aeronautics, 2015, 932-938.

Sangwan, Vinod K. et al., "Electronic Transport in Two-Dimensional Materials", 48 pages, 2014.

Tang, Yongchao et al., "Highly Stretchable and Ultrasensitive Strain Sensor Based on Reduced Graphene Oxide Microtubes-Elastomer Composite", Applied Materials & Interfaces, Oct. 2, 2015, 8 pages.

Tsai, Meng-Yen , "Materials Challenges of Two-Dimensional Materials for Flexible Sensing Applications", Georgia Institute of Technology, Dec. 2017, 251 pages.

Yao, Yao et al., "Detection of Steel Fatigue Cracks with Strain Sensing Sheets Based on Large Area Electronics", Sensors 2015, 2015, 21 pages.

Yoon, Hyeonseok , "Current Trends in Sensors Based on Conducting Polymer Nanomaterials", Nanomaterials 2013, 3, 524-549; doi: 10.3390/nano3030524, 2013, 26 pages.

Zhang, Shangjie et al., "Highly stretchable, sensitive, and flexible strain sensors based on silver nanoparticles/carbon nanotubes composites", Journal of Alloys and Compounds 652 (2015) 48-54, 2015, 7 pages.

Zhou, Jun et al., "Flexible Piezotronic Strain Sensor", Nano Letters 2008, vol. 8, No. 9 3035-3040, 2008, 6 pages.

* cited by examiner

SENSOR BASED ON SMART RESPONSE OF TWO-DIMENSIONAL NANOMATERIAL AND ASSOCIATED METHOD

FIELD OF THE DISCLOSURE

The subject disclosure relates to a sensor based on a smart response of a two-dimensional nanomaterial and an associated method. In one example, provided is a tunable sensor (and associated method) for detection of substrate change (e.g., damage) based on a smart response of a two-dimensional nanomaterial coating.

BACKGROUND

Two-dimensional materials are a special group of nanomaterials that, due to atomic thickness, have very different properties from bulk materials. An example of such a two-dimensional material is graphene, a single-atom layer of carbon, forming a hexagonal lattice. The two-dimensional aspect of various two-dimensional materials leads to tunable electronic and mechanical properties (which differ from properties associated with bulk materials). Since the surface of a two-dimensional material dominates material properties, changes at the surface can lead to dramatic changes of, for example, mechanical stiffness and/or electrical conductivity.

BRIEF DESCRIPTION OF THE DRAWINGS

Reference will now be made to the accompanying drawings, which are not necessarily drawn to scale, and wherein:

FIG. 1A shows initial removal of atoms to prepare material for stress-induced response. As seen in this example, two Se vacancies 110, 111 and two S vacancies 121, 122 are created at the manufacture stage.

FIG. 1B shows stress-induced atom migration, leading to creation of vacancies and formation of metallic islands due to high vacancy concentrations. As seen in this example, during operation a vacancy creation process has resulted in there now being five Se vacancies 110, 111, 112, 113, 114 and five S vacancies 121, 122, 123, 124, 125. In this figure, a Molybdenum Metallic Region is indicated by the area within the dashed rectangle.

FIG. 2A is a top view. FIG. 2B is a cross-sectional view that shows a cross-section (the cross-section is taken along the horizontal line shown in FIG. 2A; the horizontal line is an imaginary line and does not represent a feature or element of the sensor).

FIG. 2C is a top view and FIG. 2D is a side view.

FIG. 2E is a top view and FIG. 2F is a side view.

FIG. 2G is a top view and FIG. 2H is a side view.

FIG. 2I is a top view and FIG. 2J is a side view.

DETAILED DESCRIPTION

The subject disclosure describes, among other things, illustrative embodiments for a sensor (and associated method) configured to detect substrate change (e.g., damage) based on a response of a two-dimensional coating. Other embodiments are described in the subject disclosure.

As described herein, various embodiments provide for interfacing a two-dimensional material with a substrate (e.g., a surface of a cell phone tower element) in order to provide in-situ observation of structural integrity of the substrate (e.g., the cell phone tower element).

Figure 1A:
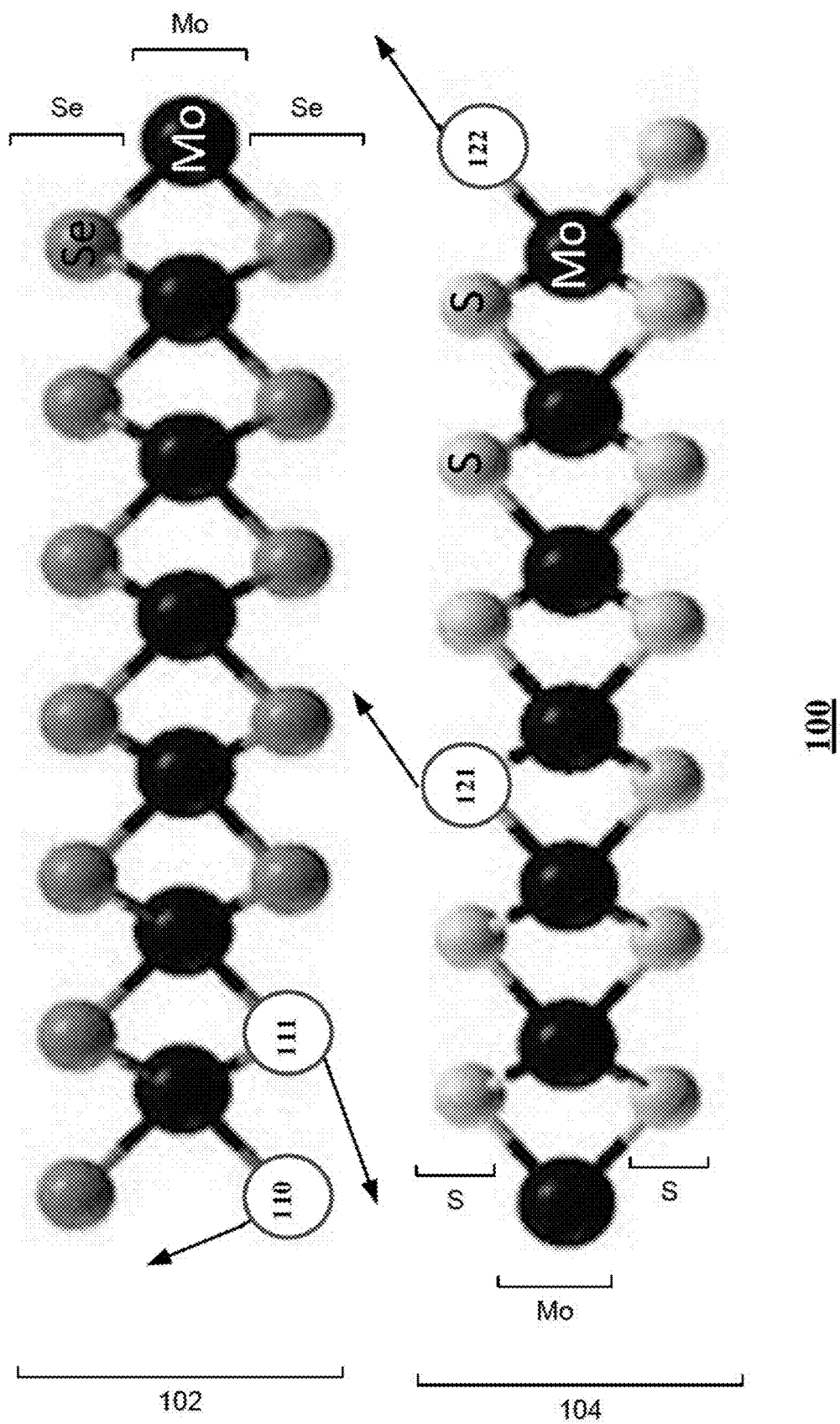
FIG. 1A is a diagram illustrating an example, non-limiting embodiment of a sensor 100 formed of one coating 102 (comprising Mo atoms and Se atoms) and another coating 104 (comprising Mo atoms and S atoms) in accordance with various aspects described herein (in this figure, a substrate is not shown). This
Figure 1B:
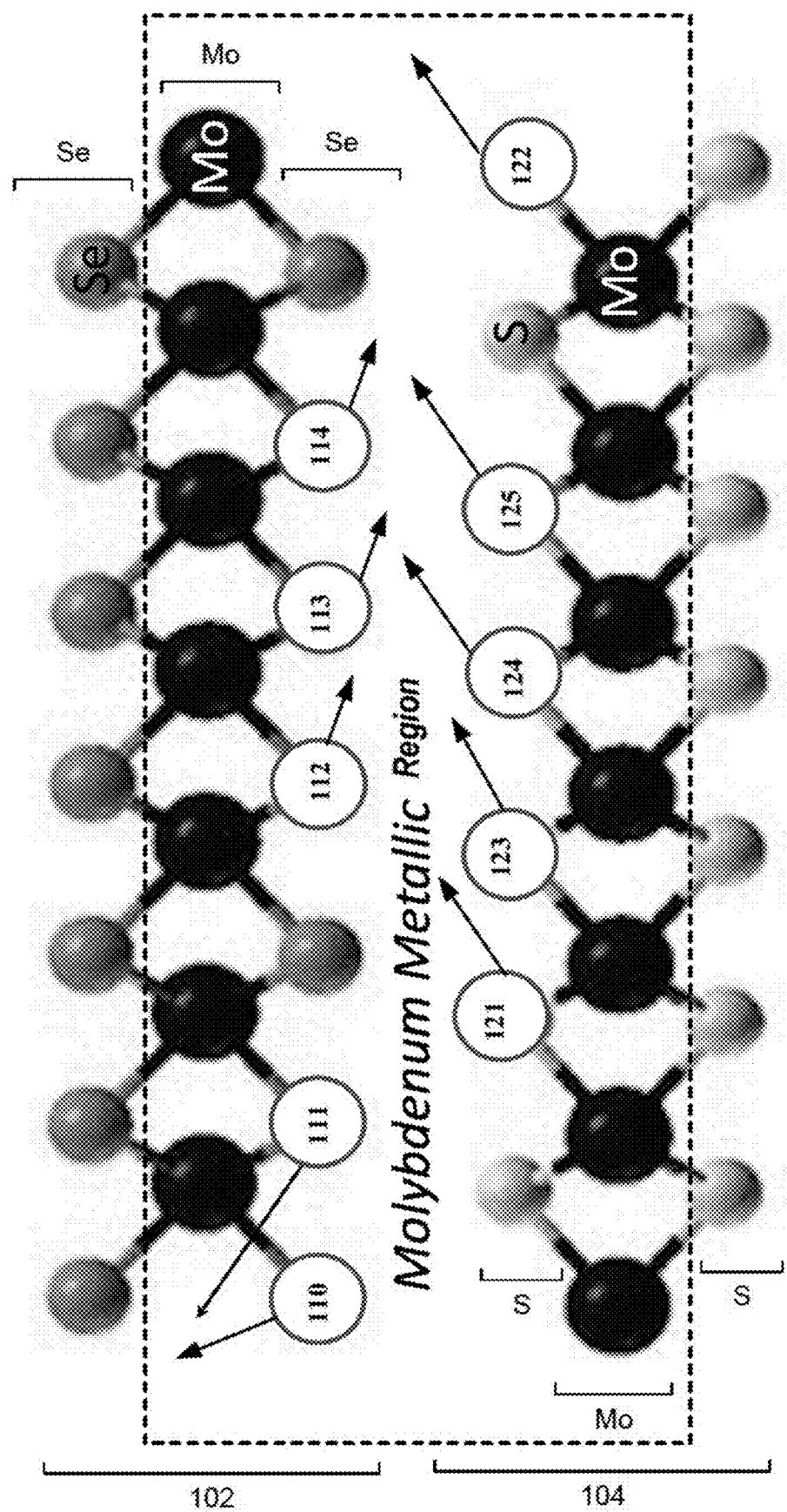
FIG. 1B is a diagram illustrating an example, non-limiting embodiment of sensor 100 (of FIG. 1A) in accordance with various aspects described herein (in this figure, a substrate is again not shown). This

At a manufacturing stage, a two-dimensional material can be constructed to be sensitive to particular mechanical deformations by implanting defects, as shown in FIG. 1A. The defects can be activated as described herein by (for example) external physical stress, electromagnetic radiation and/or temperature changes. FIG. 1B shows activation and movement of the defects (subsequent to the implantation of the defects as shown in FIG. 1A) due to changes in a structure of material (such as a substrate with which a sensor interfaces). The motion of defects changes electronic properties of the two-dimensional material, causing a formation of one or more electrical conducting paths (shown, for example, in FIGS. 2A, 2B). The one or more electrical conducting paths can be, for example, between a left side of the sensor shown in FIGS. 2A, 2B and a right side of the sensor shown in FIGS. 2A, 2B. The presence of the electrical conductive path(s) can be ascertained (such as by monitoring resistance and/or conductivity across the sensor from the left side of the sensor shown in FIGS. 2A, 2B to the right side of the sensor shown in FIGS. 2A, 2B. The presence of the electrical conductive path(s) can be used as a trigger to activate a signal (e.g., a visual signal and/or an audio signal). In one example, this signal can warn of a particular wear-and-tear of the observed substrate (e.g., element of a cell phone tower). In another example, this signal can warn of a catastrophic failure of the observed substrate (e.g., element of a cell phone tower).

In one specific example, provided is an initially insulating two-dimensional $MoS_2/MoSe_2$ bilayer, which has a small bandgap of ~1 eV, with a concentration of Se and S vacancies. Applying stress to such material (thereby straining the material) will cause vacancies to segregate at the interface, leaving (in this example) a metallic Mo-rich region, shown in the dashed box in FIG. 1B. This metallic region forms a path to signal microscopic fractures (such as, for example, as precursor of catastrophic failure). In one specific example, the substrate that is monitored by the sensor is a structurally important cell phone tower element.

In one embodiment, a method comprises applying to a substrate (such as, for example, a leg of a cell phone tower, a supporting structure on a cell phone tower, an antenna mount) a first coating that is two-dimensional (e.g., on the order of one or a few atomic-layers-thick); applying to the first coating a second coating that is two-dimensional (e.g., on the order of one or a few atomic-layers-thick); wherein the first coating and the second coating form a sensor (which, given the thinness of the first and second coatings, is in aggregate still considered two-dimensional with, for example, a thickness of less than ten lattice constants). In one example, the sensor has a first dimension along a first axis (e.g., length) and a second dimension along a second axis (e.g., width). There can be an initial electrical resistance across the sensor along the first axis. A detection can be made (e.g., by a processing system including a processor) of a presence of a new electrical resistance across the sensor along the first axis (wherein the new electrical resistance is caused by a change to the substrate). In one specific example, the change to the substrate is a mechanical change. In another specific example, the mechanical change is a crack, a fracture and/or a strain in the substrate. In another specific example, the change to the substrate is caused by mechanical stress, a temperature change, a humidity change, a change in incident light, or any combination thereof.

In one example, the first coating can be deposited by film deposition. In another example, the second coating can be deposited by film deposition. In another example, each of the first coating and the second coating can be deposited by film deposition.

In one example, the $MoS_2$ layer is deposited on a substrate and then the $MoSe_2$ layer is deposited on the $MoS_2$ layer. In another example, the $MoSe_2$ layer is deposited on a substrate and then the $MoS_2$ layer is deposited on the $MoSe_2$ layer.

Figure 2A:
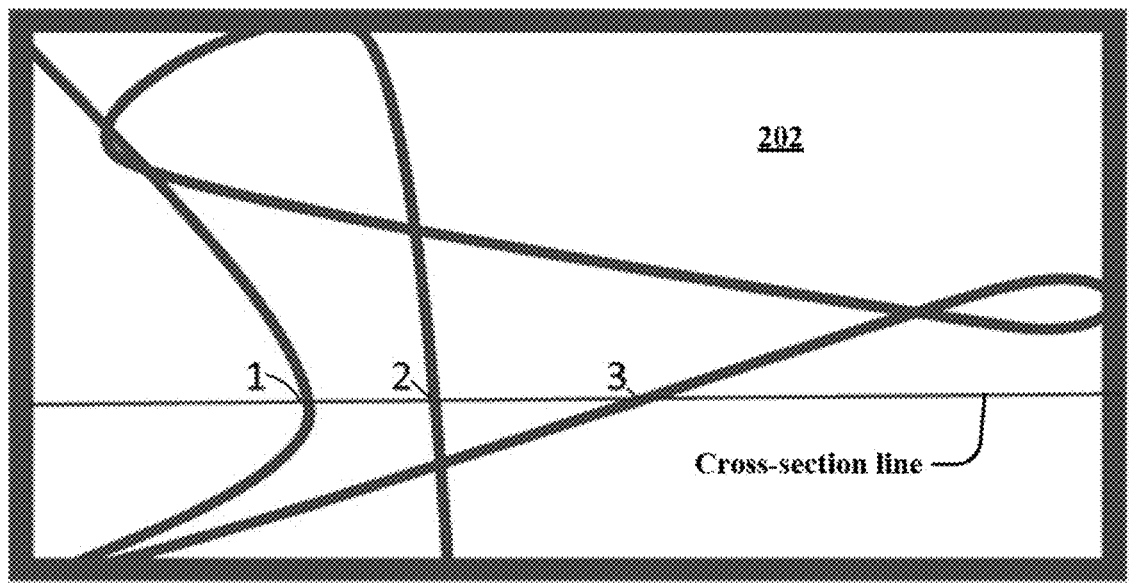
FIGS. 2A and 2B are diagrams illustrating an example, non-limiting embodiment of a sensor 202 formed on a substrate 204 (e.g., monitored material) in accordance with various aspects described herein.
Figure 2B:
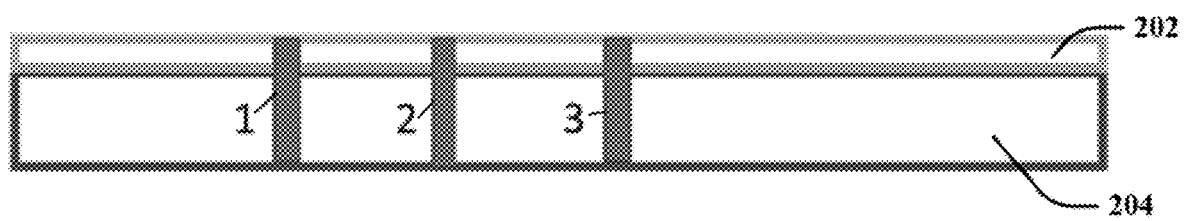

FIGS. 2A and 2B are diagrams illustrating an example, non-limiting embodiment of a sensor 202 formed on a substrate 204 (e.g., monitored material) in accordance with various aspects described herein. FIG. 2A is a top view. FIG. 2B is a cross-sectional view that shows a cross-section (the cross-section is taken along the horizontal line shown in FIG. 2A; the horizontal line is an imaginary line and does not represent a feature or element of the sensor). In these FIGS. 2A and 2B, there has been formation of metallic paths (through the sensor) in areas above the substrate 204 that are under stress. These metallic paths are shown (in the top view of FIG. 2A) as curved lines in the sensor 202 and are shown (in the cross-section of FIG. 2B) as corresponding vertical lines in the sensor 202. As seen in FIG. 2A, these metallic paths span across the sensor 202 to reach contacts (not shown) on each side of the sensor 202. As seen in FIG. 2B, damage in the substrate (see the vertical lines) induces a corresponding change in the two-dimensional material of the sensor, leading to formation of metallic islands in the two-dimensional material.

Figure 2C:
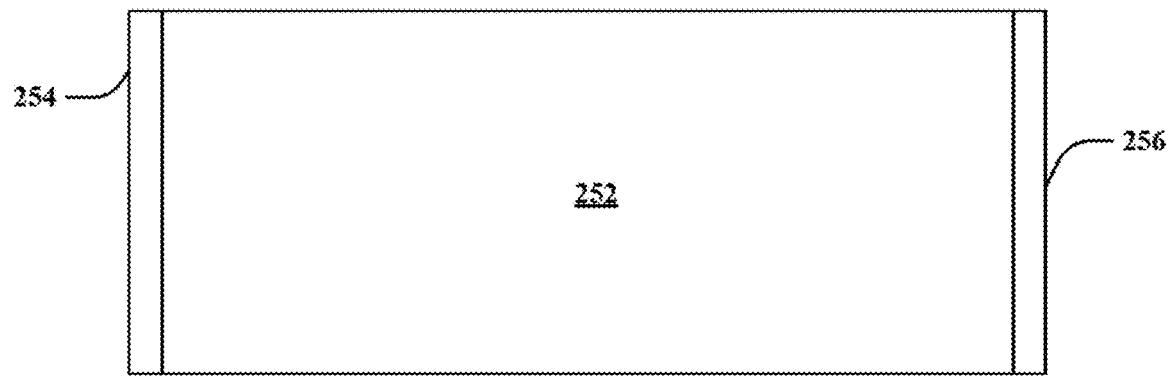
FIGS. 2C and 2D are diagrams illustrating an example, non-limiting embodiment of a sensor formed on a substrate.
Figure 2D:
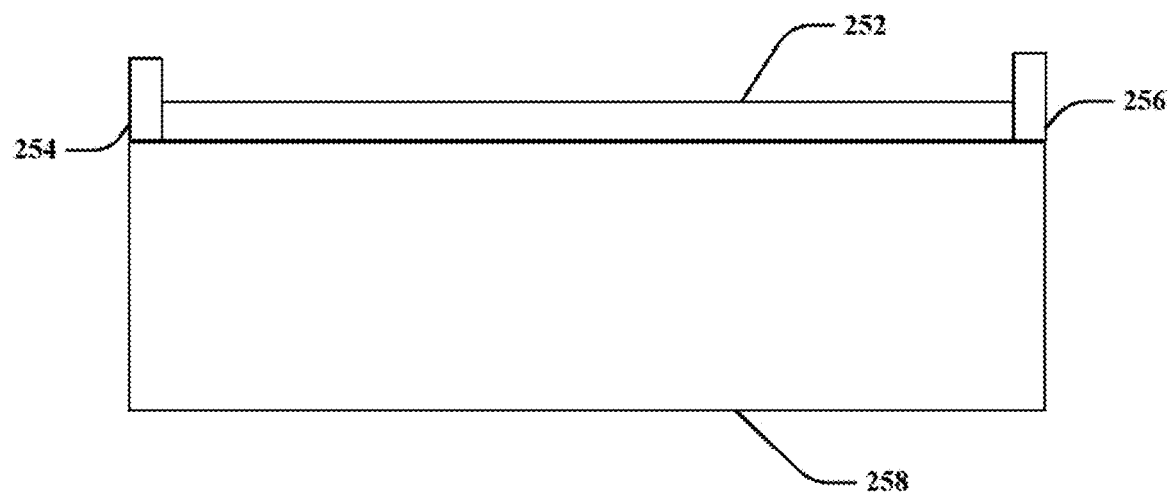

Referring now to FIGS. 2C and 2D, these are diagrams illustrating an example, non-limiting embodiment of a sensor (including surface 252) formed on a substrate 258. Electrical contacts 254,256 are in electrical communication with surface 252. FIG. 2C is a top view and FIG. 2D is a side view.

Figure 2E:
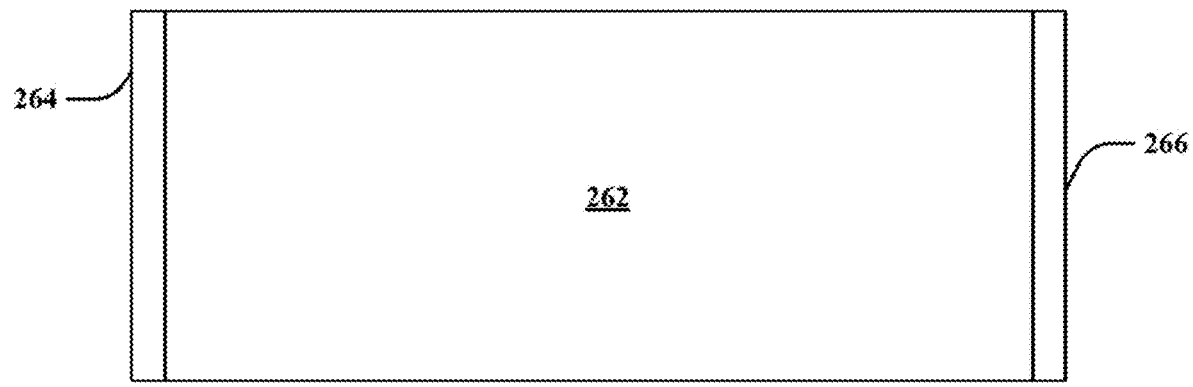
FIGS. 2E and 2F are diagrams illustrating an example, non-limiting embodiment of a sensor formed on a substrate.
Figure 2F:
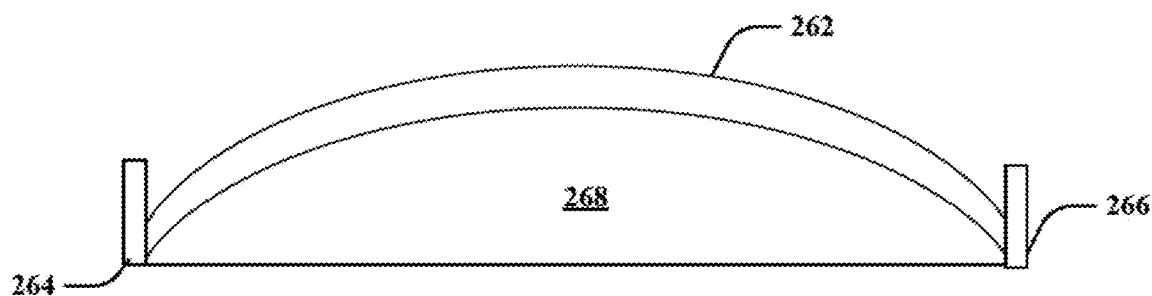

Referring now to FIGS. 2E and 2F, these are diagrams illustrating an example, non-limiting embodiment of a sensor (including surface 262) formed on a substrate 268. Electrical contacts 264,266 are in electrical communication with surface 262. FIG. 2E is a top view and FIG. 2F is a side view.

Figure 2G:
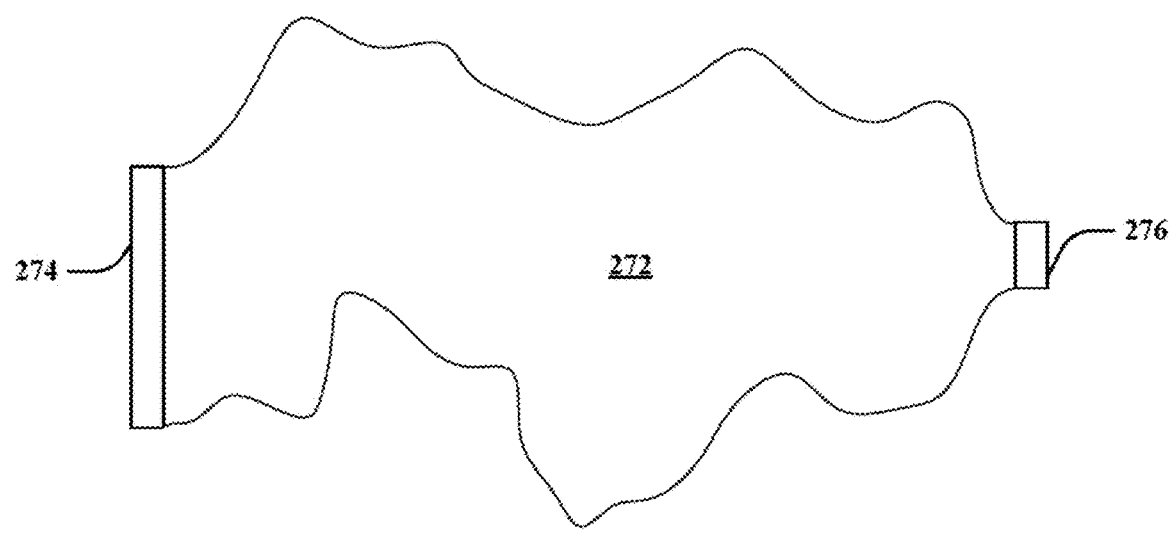
FIGS. 2G and 2H are diagrams illustrating an example, non-limiting embodiment of a sensor formed on a substrate.
Figure 2H:
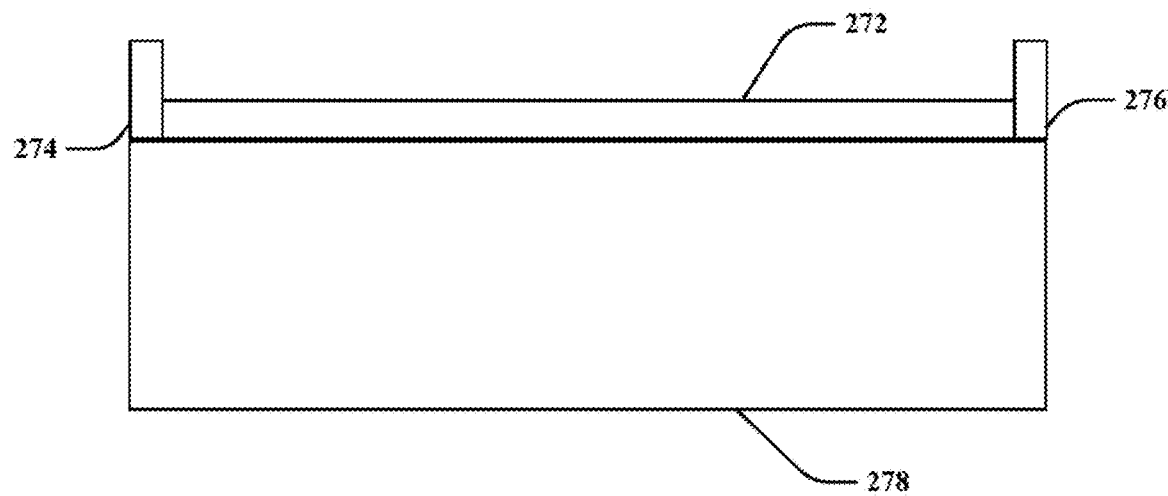

Referring now to FIGS. 2G and 2H, these are diagrams illustrating an example, non-limiting embodiment of a sensor (including surface 272) formed on a substrate 278. Electrical contacts 274,276 are in electrical communication with surface 272. FIG. 2G is a top view and FIG. 2H is a side view.

Figure 2I:
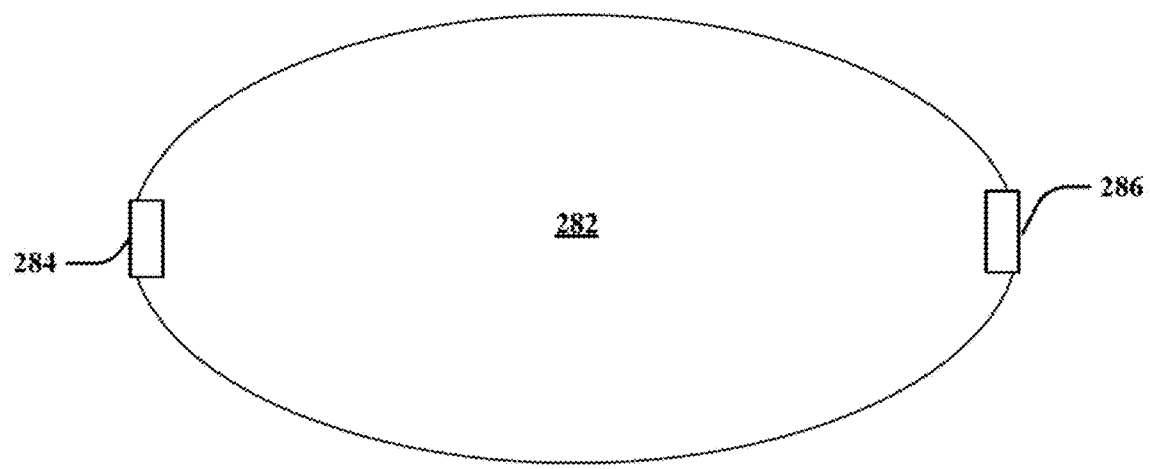
FIGS. 2I and 2J are diagrams illustrating an example, non-limiting embodiment of a sensor formed on a substrate.
Figure 2J:
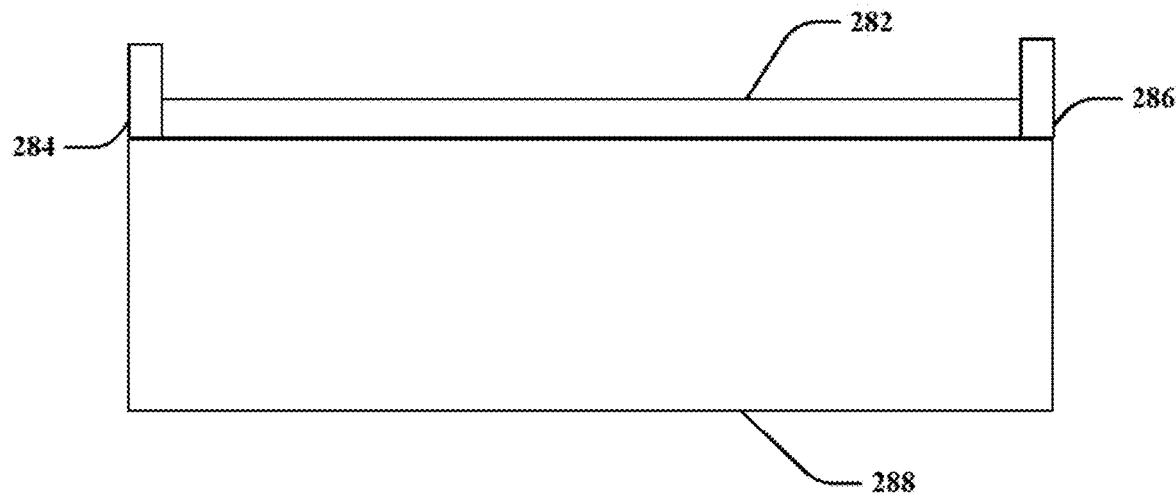

Referring now to FIGS. 2I and 2J, these are diagrams illustrating an example, non-limiting embodiment of a sensor (including surface 282) formed on a substrate 288. Electrical contacts 284,286 are in electrical communication with surface 282. FIG. 2I is a top view and FIG. 2J is a side view.

As described herein, the sensor (e.g., comprising a first two-dimensional coating and a second two-dimensional coating) can be applied to a substrate having a flat or otherwise contoured surface (e.g., curved surface, wavy surface).

As described herein, the sensor (e.g., comprising a first two-dimensional coating and a second two-dimensional coating) can be applied to a substrate in such a manner that the sensor has (as seen in a top view) any desired shape.

Figure 3:
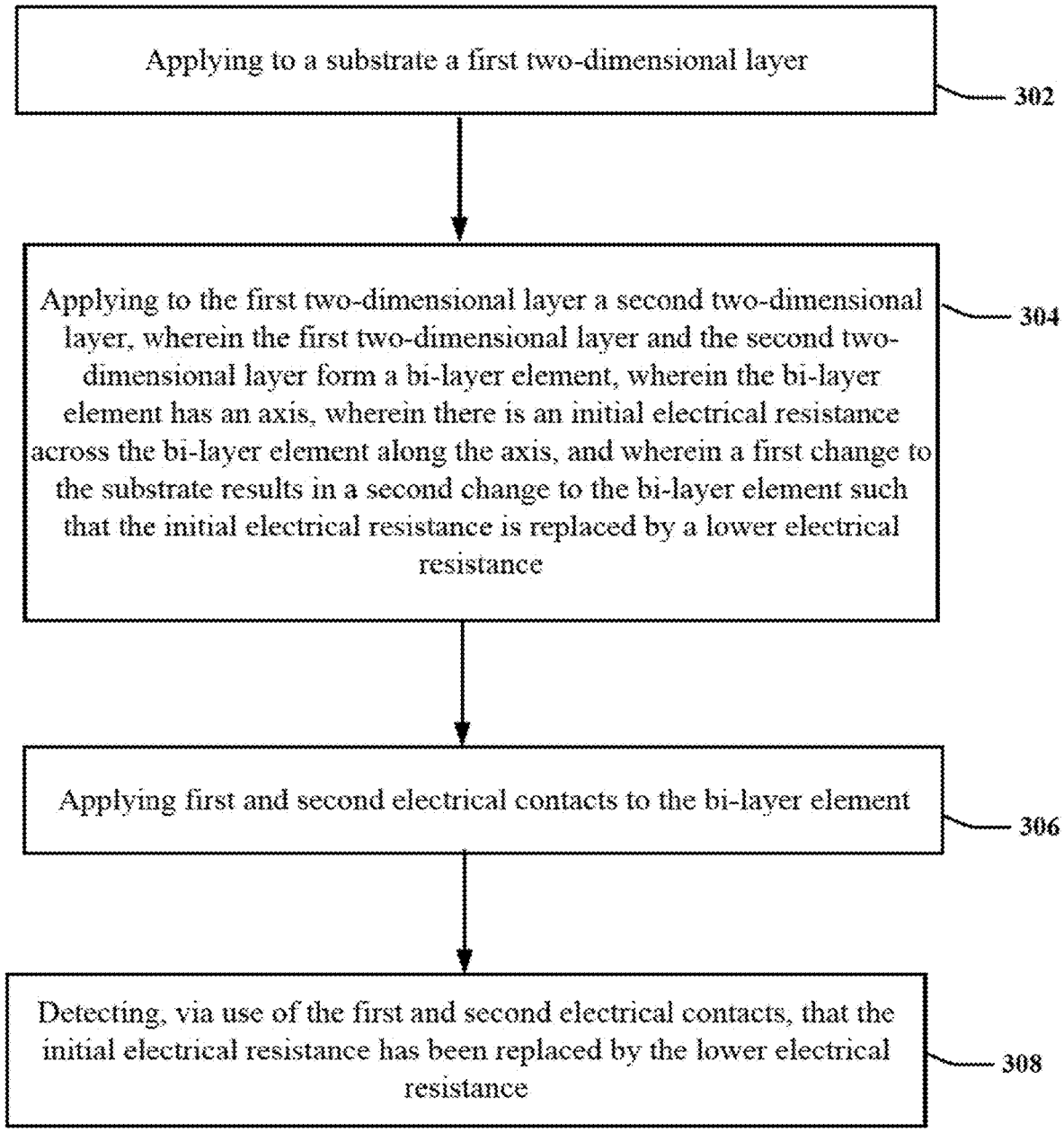
FIG. 3 depicts an illustrative embodiment of a method in accordance with various aspects described herein.

Referring now to FIG. 3, various steps of a method 300 according to an embodiment are shown. As seen in this FIG. 3, step 302 comprises applying to a substrate a first two-dimensional layer. Next, step 304 comprises applying to the first two-dimensional layer a second two-dimensional layer, wherein the first two-dimensional layer and the second two-dimensional layer form a bi-layer element, wherein the bi-layer element has an axis, wherein there is an initial electrical resistance across the bi-layer element along the axis, and wherein a first change to the substrate results in a second change to the bi-layer element such that the initial electrical resistance is replaced by a lower electrical resistance. Next, step 306 comprises applying first and second electrical contacts to the bi-layer element. Next, step 308 comprises detecting, via use of the first and second electrical contacts, that the initial electrical resistance has been replaced by the lower electrical resistance.

In one embodiment, the first two-dimensional layer is a first coating that is applied to the substrate by a first film deposition. In another embodiment, the second two-dimensional layer is a second coating that is applied to the first coating by a second film deposition.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can be applied in the context of consumer, commercial, and/or government agency devices and systems.

As described herein, various embodiments provide for constructing one or more sensors (e.g., one or more sensors for detecting damage or other changes to a substrate).

As described herein, various embodiments provide for using one or more sensors (e.g., using one or more sensors for detecting damage or other changes to a substrate).

In various examples the substrate (e.g., monitored material) can be any material or structure whose state or condition it is desired to be monitored.

Reduction of manufacturing costs for nanomaterials facilitates development of "smart materials" and their application to change the landscape of how various items are made. As described herein, flexibility and tunability of nanomaterial properties can be used to engineer a response to environmental conditions, such as electromagnetic radiation, temperature and humidity. In various examples, this response can be pre-trained at the manufacturing stage and used to monitor specific changes in integrity of various structures. In various examples, immediate damage and/or wear-and-tear over time are reflected in microscopic deformations, which trigger a pre-defined response in nanomaterials, followed by one or more "smart responses".

In various embodiments, mechanisms are provided to use trending to predict the likelihood of an upcoming structural failure (or other damage).

In various embodiments, provided is an approach that is functionally proactive in that it can be able to detect problems (e.g., material imperfections, fractures, stresses, etc.) that are building up over time. An example of such monitoring for a particular area of material is shown in FIGS. 2A and 2B, where local material degradation causes a metallization of smart material and triggering of an appropriate warning (e.g., constituting "smart response").

In another example, one or more atomic vacancies can be created in the coating(s) as a result of an application of heat.

In another example, each coating can comprise a film (e.g., grown in a laboratory). In another example, any desired monitored material can be coated (e.g., by film deposition).

In another example, the sensor can be wrapped around a monitored material (e.g., a cell phone tower leg).

In another example, the coating(s) can prevent (or otherwise inhibit) environmental damage to the substrate (e.g., the coating(s) could prevent (or otherwise inhibit) oxidation).

In another example, the signal that is based upon the change in the substrate can be a quick reaction signal (e.g., the signal can be generated within a short time span).

Various embodiments can be applied to various tower types (e.g., Monopole, Lattice, Guyed). Such tower types are typically used for network support and typically have moderately simple designs but typically require regular monitoring, auditing, and assessment to determine what kind of damage (if any) has been sustained (such as due to wear-and-tear or catastrophic impacts). Even considering the relatively simple structure and design of a common cell phone tower there are a wide variety of problems that arise due to weather, climate, and other external factors. Various embodiments described herein provide certain advantages over conventional monitoring of such towers (such conventional monitoring typically uses manual audits as well as motion sensors and other basic sensors to monitor basic issues).

Figure 4:
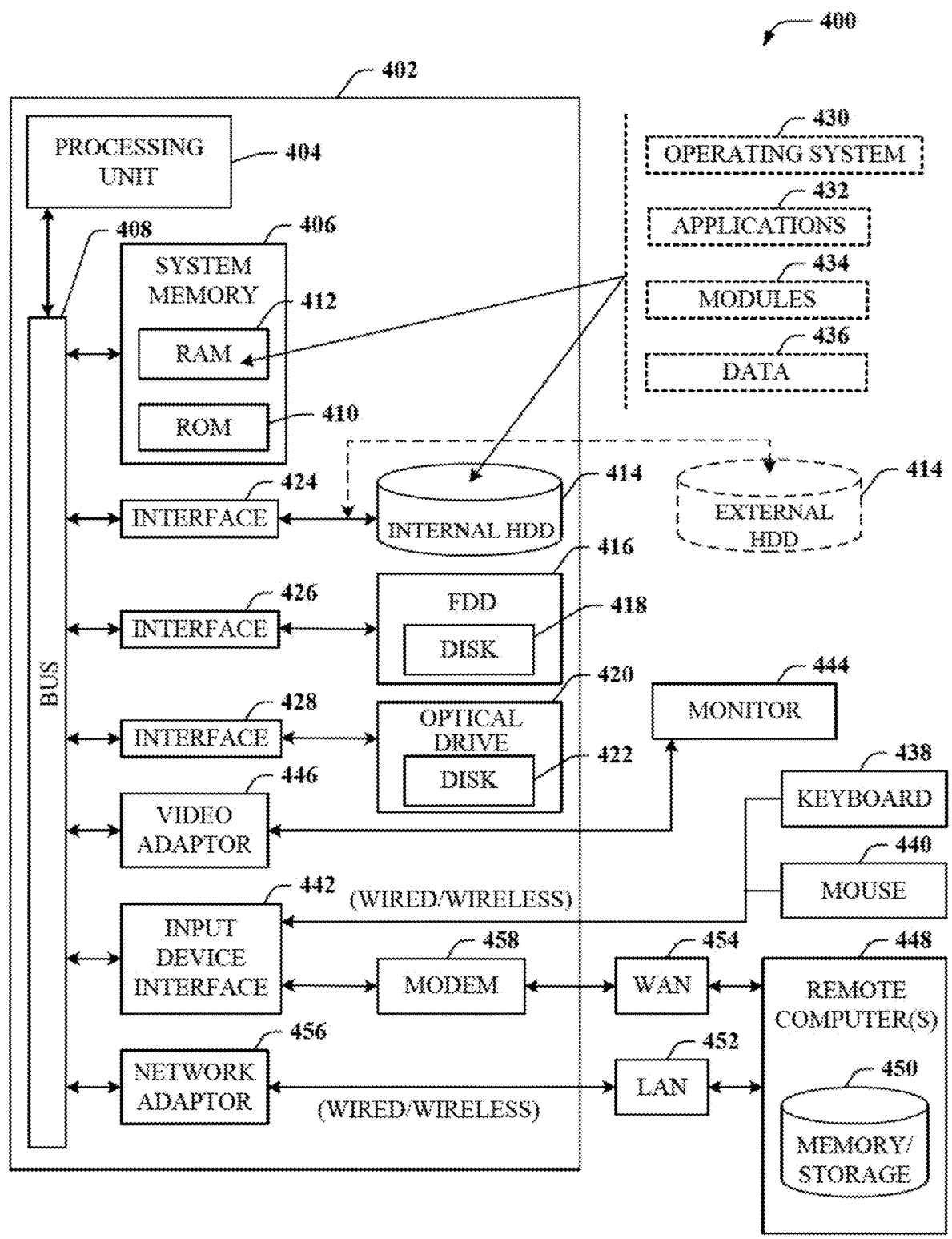
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In one example, implementation can be via computer-executable instructions that can run on one or more computers, and/or in combination with other program modules and/or as a combination of hardware and software. For example, computing environment 400 can facilitate in whole or in part manufacturing of a sensor as described herein and/or use of a sensor as described herein.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically manufacturing a sensor and/or automatically utilizing a sensor) can employ various AI-based schemes for carrying out various embodiments thereof. Moreover, a classifier can be employed to determine a ranking or priority. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing user behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to automatically manufacturing a sensor and/or automatically utilizing a sensor, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
applying to a substrate a first two-dimensional, nanomaterial layer;
applying to the first two-dimensional, nanomaterial layer a second two-dimensional, nanomaterial layer, wherein the first two-dimensional, nanomaterial layer and the second two-dimensional, nanomaterial layer form a bi-layer element, wherein the bi-layer element has an axis, wherein there is an initial electrical resistance across the bi-layer element along the axis, and wherein a first change to the substrate results in a second change to the bi-layer element such that the initial electrical resistance is replaced by a lower electrical resistance; and
detecting, by a processing system including a processor, presence of the lower electrical resistance across the bi-layer element.

2. The method of claim 1, wherein the first two-dimensional nanomaterial layer is applied to the substrate by a first film deposition.

3. The method of claim 2, wherein the second two-dimensional nanomaterial layer is applied to the first two-dimensional, nanomaterial layer by a second film deposition.

4. The method of claim 1, wherein:
the applying the first two-dimensional, nanomaterial layer comprises a first anion-poor deposition of the first two-dimensional, nanomaterial layer on the substrate, resulting in a deficit of Sulfur (S) atoms in the first two-dimensional, nanomaterial layer to produce first atomic vacancies; and
the applying the second two-dimensional, nanomaterial layer comprises a second anion-poor deposition of the second two-dimensional, nanomaterial layer on the first two-dimensional, nanomaterial layer, resulting in a deficit of Selenium (Se) atoms in the second two-dimensional, nanomaterial layer to produce second atomic vacancies.

5. The method of claim 4, wherein:
the first two-dimensional, nanomaterial layer is Molybdenum Disulfide ($MoS_2$); and
the second two-dimensional, nanomaterial layer is Molybdenum Diselenide ($MoSe_2$).

6. The method of claim 1, wherein the first change to the substrate comprises a mechanical change, and wherein the substrate comprises part of a cell phone tower.

7. The method of claim 6, wherein the mechanical change comprises a crack.

8. The method of claim 1, wherein the first change to the substrate is caused by mechanical stress, a temperature change, a humidity change, a change in incident light, or any combinations thereof.

9. The method of claim 1, wherein the second change to the bi-layer element comprises migration of first atoms from the first two-dimensional, nanomaterial layer to produce first atomic vacancies, migration of second atoms from the second two-dimensional nanomaterial layer to produce second additional atomic vacancies, or any combination thereof.

10. The method of claim 1, wherein the substrate comprises all or a portion of a cell phone tower, all or a portion of an antenna mount, or any combinations thereof.

11. A sensor comprising:
a first two-dimensional coating applied to a substrate; and
a second two-dimensional coating applied to the first two-dimensional coating, wherein there is a first electrical resistance across the sensor from a first side of the sensor to a second side of the sensor, wherein a change to the substrate results in a creation of atomic vacancies at an interface between the first two-dimensional coating and the second two-dimensional coating, and wherein the creation of the atomic vacancies changes the first electrical resistance across the sensor to a lower electrical resistance.

12. The sensor of claim 11, further comprising circuitry configured to detect a presence of the lower electrical resistance.

13. The sensor of claim 12, wherein the circuitry comprises a first electrical contact on the first side of the sensor, a second electrical contact on the second side of the sensor, and a measurement device in operative communication with the first electrical contact and the second electrical contact, and wherein the measurement device is configured to measure electrical resistance.

14. The sensor of claim 11, wherein the first two-dimensional coating is applied to the substrate by a first film deposition and wherein the second two-dimensional coating is applied to the first two-dimensional coating by a second film deposition.

15. The sensor of claim 14, wherein:
the first two-dimensional coating is Molybdenum Disulfide ($MoS_2$); and
the second two-dimensional coating is Molybdenum Diselenide ($MoSe_2$).

16. A device comprising:
a first two-dimensional layer applied to a substrate;
a second two-dimensional layer applied to the first two-dimensional layer, wherein the first two-dimensional layer and the second two-dimensional layer form a bi-layer element, wherein there is a starting electrical resistance across the bi-layer element, wherein a physical change to the bi-layer element results in a creation of atomic vacancies at an interface between the first two-dimensional layer and the second two-dimensional layer, and wherein the creation of the atomic vacancies reduces the starting electrical resistance to a lower value;
a processing system including a processor; and
a memory that stores executable instructions that, when executed by the processing system, facilitate performance of operations, the operations comprising:
detecting that the starting electrical resistance has been reduced.

17. The device of claim 16, wherein the detecting that the starting electrical resistance has been reduced comprises detecting that the starting electrical resistance has been reduced to the lower value.

18. The device of claim 17, wherein the operations further comprise:
outputting a signal, wherein the signal is output responsive to the detecting that the starting electrical resistance has been reduced, and wherein the signal is a visual signal, an audio signal or any combinations thereof.

19. The device of claim 18, wherein:
in a first case, the first two-dimensional layer is Molybdenum Disulfide ($MoS_2$), the Molybdenum Disulfide ($MoS_2$) is applied to the substrate by a first film deposition, the second two-dimensional layer is Molybdenum Diselenide (MoSe$_2$), and the Molybdenum Diselenide (MoSe$_2$) is applied to the first two-dimensional layer by a second film deposition; or in a second case, the first two-dimensional layer is Molybdenum Diselenide (MoSe$_2$), the Molybdenum Diselenide (MoSe$_2$) is applied to the substrate by a third film deposition, the second two-dimensional layer is Molybdenum Disulfide (MoS$_2$) and the Molybdenum Disulfide (MoS$_2$) is applied to the first two-dimensional layer by a fourth film deposition.

20. The device of claim 16, further comprising circuitry configured to detect the starting electrical resistance.

* * * * *